(12) United States Patent
Alaimo et al.

(10) Patent No.: US 11,974,047 B1
(45) Date of Patent: Apr. 30, 2024

(54) LIGHT SOURCE MODULE WITH INTEGRATED AMBIENT LIGHT SENSING CAPABILITY

(71) Applicant: Apple Inc., Cupertino, CA (US)

(72) Inventors: Angelo M Alaimo, San Jose, CA (US); Shahrooz Shahparnia, Cupertino, CA (US); Paul V. Johnson, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 212 days.

(21) Appl. No.: 17/468,611

(22) Filed: Sep. 7, 2021

(51) Int. Cl.
| | | |
|---|---|---|
| *H04N 23/74* | (2023.01) | |
| *G01J 1/42* | (2006.01) | |
| *G01J 1/44* | (2006.01) | |
| *G06F 1/16* | (2006.01) | |

(52) U.S. Cl.
CPC ............ *H04N 23/74* (2023.01); *G01J 1/4204* (2013.01); *G01J 1/429* (2013.01); *G01J 1/44* (2013.01); *G06F 1/1686* (2013.01); *G01J 2001/444* (2013.01)

(58) Field of Classification Search
CPC ........ H04N 23/74; G01J 1/4204; G01J 1/429; G01J 1/44; G01J 2001/444; G06F 1/1686
See application file for complete search history.

(56) References Cited

U.S. PATENT DOCUMENTS

| | | | |
|---|---|---|---|
| 7,289,144 B2 | 10/2007 | Arazaki | |
| 8,068,148 B2 | 11/2011 | Noyes et al. | |
| 8,648,929 B2 | 2/2014 | Ho et al. | |
| 8,711,245 B2 | 4/2014 | Kinrot et al. | |
| 10,367,986 B1 * | 7/2019 | Berenberg | H04N 23/60 |
| 10,498,401 B1 * | 12/2019 | Rule | H04N 23/60 |
| 2004/0201729 A1 | 10/2004 | Poplin et al. | |
| 2007/0139345 A1 | 6/2007 | Shie et al. | |
| 2011/0181753 A1 | 7/2011 | Sugie | |
| 2012/0236175 A1 | 9/2012 | Kinrot | |
| 2014/0214362 A1 | 7/2014 | Chen et al. | |

(Continued)

FOREIGN PATENT DOCUMENTS

WO 2007/049900 5/2007

OTHER PUBLICATIONS

U.S. Appl. No. 62/133,108, filed Mar. 13, 2015, Douglas K. Tao.

(Continued)

*Primary Examiner* — Shahbaz Nazrul
(74) *Attorney, Agent, or Firm* — Robert C. Kowert; Kowert, Hood, Munyon, Rankin & Goetzel, P.C.

(57) ABSTRACT

Various embodiments include a light source module with one or more light emitters and one or more light sensors that share an aperture via which light passes. One of the light sensors may measure illuminance received through the aperture (not illuminance from the light emitters) and send a signal indicating a measurement of the illuminance. The light source module may be integrated into a portable computing device having a controller. The controller may include logic to perform one or more device operations based on the measurement of illuminance, such as, but not limited to, controlling a device display brightness and/or controlling an auto exposure feature of the device camera. Calibration parameters for interpreting the signal may be determined via a calibration process.

20 Claims, 8 Drawing Sheets

(56) References Cited

U.S. PATENT DOCUMENTS

2019/0072836 A1* 3/2019 Karp ................ G03B 11/045
2021/0250485 A1* 8/2021 Yuan ................ H04N 23/651

OTHER PUBLICATIONS

International Search Report and Written Opinion from PCT/US2016/021348, dated Jun. 3, 2016, Apple Inc., pp. 1-14.

"Using LEDs as Light-Level Sensors and Emitters", Oct. 2009, Ver. 2.1, Retrieved from URL: https://www.altera.com/content/dam/altera-www/global/en_US/pdfs/literature/wp/wp-01076-led-driver-reduces-power-adjusting-intensity-ambient-light.pdf, pp. 1-6.

Apple, "Adjust the brightness and color temperature on your iPhone, iPad, or iPod touch", Retrieved from https://support.apple.com/en-us/HT202613, dated Jul. 1, 2021, pp. 1-3.

"Ambient Light Sensors on iPhone 8 and iPhone X", Retrieved from https://www.mobiledefenders.com/blog/ambient-light-sensors-in-iphone-8-and-iphone-x on Jul. 1, 2021, pp. 1-2.

U.S. Appl. No. 14/827,141, filed Aug. 14, 2015, Douglas K. Tao.

\* cited by examiner

LIGHT SOURCE MODULE WITH INTEGRATED AMBIENT LIGHT SENSING CAPABILITY

BACKGROUND

Technical Field

This disclosure relates generally to light source modules with integrated ambient light sensing arrangements.

Description of the Related Art

The advent of small, mobile multipurpose devices such as smartphones and tablet or pad devices has resulted in a need for high-resolution, small form factor cameras for integration in the devices.

A light source module, which can include a "flash" module, "strobe" module, etc., can emit light which illuminates a space external to the lighting module and can include the camera field of view, thereby illuminating subjects within the camera field of view for images of said subjects captured by the camera. In some cases, the lighting module included in a small device includes a light source with an illumination element, such as a light emitting diode (LED) or laser diode.

Some small form factor cameras may incorporate separate light source and light sensing components. Such arrangements require separate apertures for each of the separate light source and light sensing components. Some light sensors may have limited sensing capability, such as being limited to providing an indication of amplitude (e.g., intensity or brightness) of the received light waves.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the"

are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments include a light source module with one or more light emitters and one or more light sensors that share an aperture via which light passes. One of the light sensors may measure illuminance received through the aperture and send a signal indicating a measurement of the illuminance. The light source module may be integrated into a mobile computing device having a controller. The controller may include logic to perform one or more device operations based on the measurement of illuminance, such as, but not limited to, controlling a device display brightness and/or controlling an auto exposure feature of the device camera.

In some embodiments, a benefit of including the light sensing module within a light source module is the elimination of an additional aperture within a mobile device. Such an arrangement utilizes an optically clear and available surface for light to be sensed, in embodiments. Some such arrangements may also expand the role of a light emitting module to provide more functionality to other components within a device system.

In some embodiments, the light source module may include more than one sensor. The sensor(s) may be sensors particularly suited to particular ranges of wavelengths of light (e.g., ultraviolet (UV), visible, infrared (IR), etc.). In some embodiments, the sensors may be photodiodes. The light source module may be fitted with filter masks (e.g., high or low bandpass filters) particular to the range(s) of wavelengths of light of the sensors, in some embodiments.

Calibration may be performed to assign more accurate values to the signals produced by the light source module, based on an expected response to a known illuminance in a controlled environment, in embodiments. Calibration may include determining calibration parameters for each of the sensors. In some embodiments, a cosmetic cover calibration parameter may be determined and stored. The cosmetic cover parameter may compensate for the cosmetic cover's influence on the illuminance received by the sensor.

In some embodiments, the light source module and/or the mobile device in which the light source module is housed may be fitted with light blocking material (coating, fabric, sheeting, etc.) to prevent interference between one or more light sources (e.g., a proximity sensor, etc.) of the mobile device and the light sensor(s) in the light source module.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Smartphone Example

In some embodiments, a light source module used as a photographic flash for a compact camera module in a smart phone includes one or more light sources (e.g., light emitting diodes (LEDs) other otherwise) that emit one or more color temperatures. In addition to the LED light sources, the light source module may include one or more optics that direct the light of the LEDs into space to be reflected and captured by a camera module.

In embodiments, while the light source module may emit light for the use as a photographic flash, the module may also receive light when not being used as a flash for the purpose of detecting the light environment of the mobile device and camera. For instance, the module may contain a particular application-specific integrated circuit (ASIC) die with one or more photodiodes that measure properties of the light.

Filters

In embodiments, the device may incorporate one or more filters (e.g., bandpass filters or the like) particularly-suited for passing light of a particular portion of spectrum, such as, but not limited to, the above-noted portions of spectrum. In a non-limiting example, the device may incorporate a visible light filter, an ultraviolet light filter, and/or an infrared light filter for filtering light received by one or more sensors. It is contemplated that the device may have a one-to-one ratio of filters to sensors or a one-to-many ratio of filters to sensors, or a many-to-one ratio of filters to sensors, without limitation.

In embodiments, filters can be placed over photodiodes to create high, low, or bandpass filtering of the light over the one or more photodiodes. An application (e.g., functionality of a mobile device in which the light source module is housed) may use each set of photodiodes and associated filters individually or in conjunction with each other.

The module and particular ASIC die can be calibrated to one or more known light sources having spectra in the UV, Visible, and/or infrared spectrum to provide more accurate illuminance information (e.g., measured in lux (a measurement of visible light) or otherwise (W/m$^2$ (watts per meter square, for measurement of UV, Visible, and IR light).

The illuminance information (a more accurate and useful measure of light than information from sensors that produce a signal indicating amplitude of light) can be used to aid in automation of features of the device, such as but not limited to auto-exposure, white balancing of an associated camera module or camera module array or even use for other purposes such as setting the auto-brightness of the mobile device's display.

In embodiments, a light source module with sensors that sense across a broad spectrum can provide data for an algorithm to spectrally weigh the intensity of a light's spectral content, for the purpose of classifying a light source for example. For instance, a light source containing some combination of UV, Visible, and/or Infrared is likely to be a natural light source such as the sun. A spectral weighting within just the visible range is likely to be an artificial source of light such as LED or fluorescent. Depending on the number of photodiode segments and associated filtering, it may be possible to classify light sources with greater granularity.

Sensing in the UV range may be used by the device to provide a user with information about the intensity of invisible UV light within their environment. Such sensing can be used to warn a user than the intensity of UV light they are in may be dangerous for prolonged exposure, in one non-limiting example.

Some embodiments include one or more masking material covers for the ASIC to improve the cosmetics of the module to the exterior of the product containing the light source module. In embodiments, the material should be spectrally transmissive across the UV, Visible, and Infrared spectrum. In some embodiments, the material may be colored to match the other cosmetics of the LED light sources which will be colored due to the phosphor of the LEDs. In this case, calibrating against known light sources may be required to counter-act the expected non-flat spectral transmittance response of the masking material.

In embodiments, calibration of the ASIC is done by emitting light of known characteristics into the light source module and recording the electrical response from the ASIC. It may be required to calibrate the response for multiple angles to the light source module to account for a non-linear response of the optics on the strobe module. This could then be repeated over multiple angles between the calibration source and the light source module, in embodiments.

The particular ASIC die may communicate to an application processor (e.g., over a serial connection or otherwise). Light illuminance information may be provided to the application processor of the smartphone as an analog signal or via a serial connection with the help of an internal analog-to-digital converter. The application processor can then use the information to control the camera and/or display of the mobile device to make adjustments to the camera or display settings, in embodiments.

Figure 3:
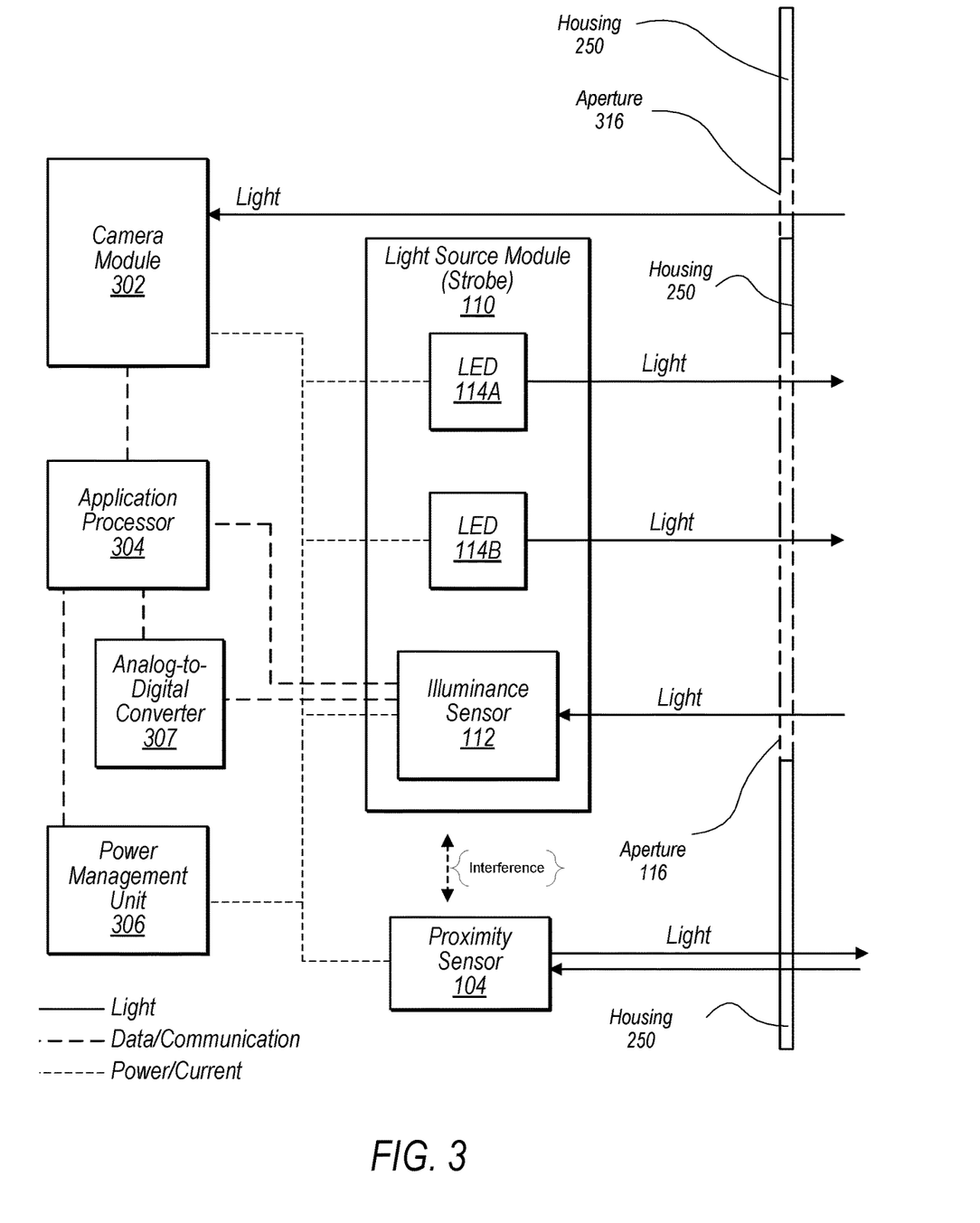
FIG. 3 illustrates a combined schematic/block diagram of portions of a light source module with integrated ambient light sensing capability via a shared aperture, in the context of a mobile device.

In some embodiments, an analog signal can be processed internally on the ASIC, or the analog signal may be output to the application processor where the application processor (AP) may have an internal analog to digital converter. In some embodiments, an external (outside that ASIC/AP) analog-to-digital converter (ADC) may be used. The external ADC receive the analog signal from the ASIC and provide the digital signal to the AP for an example (FIG. 3, described below).

Light Barriers

The module may be made to eliminate any cross talk from other UV, visible, or IR light sources from inside the module system. This includes IR transmitters for other applications such as proximity sensing, for example. This could be achieved by application of an opaque material surrounding the light source module. In some embodiments (e.g., if it is not possible to eliminate optical cross talk, or if reflections from emitting IR light sources return into the light sensing ASIC) a blanking signal may be provided between the transmitting module and the Light Sensing ASIC.

In embodiments, the device may include one or more light barriers (e.g., physical light barriers such as coatings, physical walls or other structure, or the like, that block unwanted (e.g., interfering) light from the light sensors. For example, a device may include various light emitting sources such as, but not limited to, light detection and ranging (LiDAR) components that may interfere with the light sensing components described herein. The device may incorporate various light barriers to prevent the light emitted by such light-emitting components from interfering with the light (e.g., ambient light, received from outside the device) sensed by the light-sensing component of the device. In some embodiments, the light source module may include light blocking features configured to prevent non-ambient light from interfering with the one or more light sensing components reception of ambient light via the aperture.

In some embodiments, the device may include light barriers 260 to prevent light emitted from the light source(s) 114A/B from interfering with the ambient light sensed by the light sensors 112 A/B.

In some embodiments, the device may incorporate non-physical features to eliminate or otherwise account for interference from light-emitting sources of the device. For example, one or more components of the device, such as but not limited to a controller of the device may include functionality to coordinate operation between other light-emitting features of the device and the light-sensors 112A/B, blanking-out, or ignoring the signal from the light sensors 112A/B when the light emitting features are actively emitting light. In a non-limiting example, the device may ignore the signal from the sensors 112A/B when the light sources 114A/B are actively emitting light.

In embodiments, the optic lens (e.g., located in the aperture) that is used for the light emitting of the module may be used for the light sensing ASIC. In some embodiments, a separate optic or diffusing surface may be molded into the optic lens that is separate from, and that may be separate in functionality from, the LEDs within the module.

In embodiments, the device may incorporate one or more light-sensing components (e.g., diodes, or the like) specialized to sense light for particular portions of spectrum. In some embodiments, the sensor is an illuminance sensor that is particularly tailored to produce a signal indictive of illuminance (e.g., total luminous flux incident on a surface, per unit area). The sensor may be capable of providing a more accurate measure of an illuminance of the received light than prior sensors (e.g., more accurate than other sensors that are limited to providing an indication of amplitude of the received light waves). Generally, in SI derived units these are measured in lux (lx), or equivalently in lumens per square meter ($lm/m^2$). In the CGS system, the unit of illuminance is the phot, which is equal to 10000 lux. The foot-candle is a non-metric unit of illuminance that is used in photography. The more accurate measurement of illuminance may have the benefits of supporting a more robust set of functionalities and/or improving performance of existing functionality of a device, in embodiments.

The device may incorporate one or more light-sensing component that is particularly-suited to measuring near-infrared, short infrared, mid-infrared, long-infrared or far-infrared light, as some non-exhaustive examples. In other examples, the device may incorporate one or more light-sensing components that is particularly-suited to measuring ultraviolet A, ultraviolet B, ultraviolet C, near ultraviolet, middle ultraviolet, far ultraviolet light, etc., or portions thereof. In yet another example, the device may incorporate one or more light-sensing components that is particularly-suited to measuring portions of visible light spectrum (e.g., light that is visible to a human eye).

Optical Lens

Figure 2A:
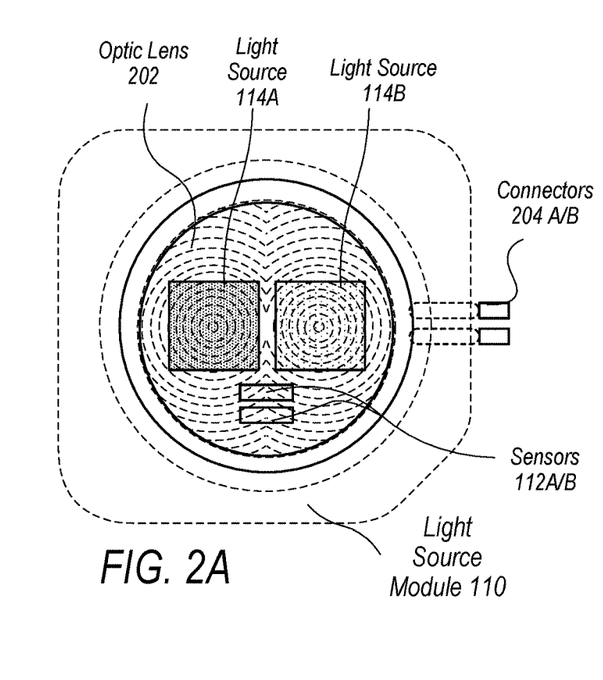
FIGS. 2A-2C illustrate embodiments of a light source module with integrated ambient light sensing capability via a shared aperture, in accordance with some embodiments.

In embodiments, optic lens 202 may include features (e.g., Fresnel-based features, in glass, plastic, etc., without limitation) that interact with the light passing through the optic lens (passing in one or both directions) so as to produce a desired effect (e.g., concentrating the light, diffusing the light, refracting, reflecting, focusing, etc. without limitation)

on the light. For example, an optic lens (or a set of optic lenses, in some embodiments) may have different features at different locations of the lens, the different features particularly-suited for receiving light by a corresponding light sensor 112 and/or particularly suited for projecting light from a corresponding light source 114, via the aperture 116.

In some embodiments, the first photodiode element and a corresponding first bandpass filter are configured to produce a signal that indicates an amount of infrared light, and the second photodiode element and a corresponding second bandpass filter are configured to produce a signal that indicates an amount of visible light. A controller may determine, based on the signal for IR light and the signal for visible light, a ratio of IR light to visible light. A portable mobile device may perform, based at least in part on the ratio, camera-based or other (device-based such as adjusting a display brightness) functions. Sensors for sensing other portions of spectrum may be mixed and matched, in embodiments.

FIGS. 1A, 1C, 3, 7 and 8 illustrate, in various embodiments, components of a device 102 that includes a light source module 110 with integrated ambient light sensing capability via a shared aperture (the light source module 110 illustrated in FIGS. 2A-C and 4). In some embodiments, the light source module 110 may be calibrated in accordance with calibration process illustrated in FIG. 5 (performed by device 102, or otherwise, without limitation). In some embodiments, a device 102 with such a light source module 110 may perform the functionality illustrated in FIG. 6.

Figure 1A:
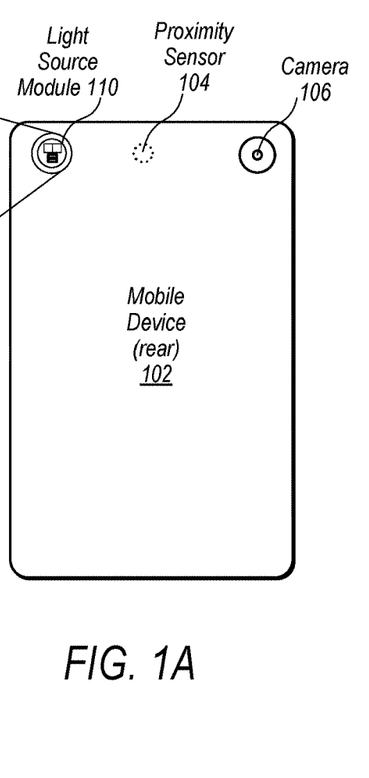
FIGS. 1A-1D illustrate a light source module with integrated ambient light sensing capability via a shared aperture, in the context of a mobile device, in accordance with some embodiments.
Figure 1B:
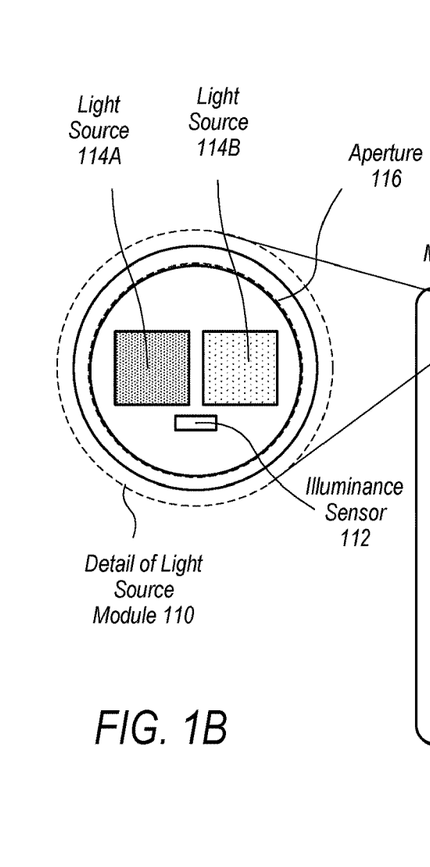

In particular, FIGS. 1A-1D illustrate a light source module with integrated ambient light sensing capability via a shared aperture, in the context of a mobile device 102, in accordance with some embodiments. FIG. 1A illustrates one side (rear) of a Mobile Device 102 with a Camera 106, Proximity Sensor 104 and Light Source Module 110. FIG. 1B illustrates detail of the Light Source Module 110 that includes Light Sources 114A/B and Illuminance Sensor 112. In some embodiments, the light source module may provide signals that indicate different measures of illuminance of different wavelengths of light (e.g., via numerous distinct sensors).

In the illustrated embodiment, the light sources 114A/B share an Aperture 116 with Illuminance Sensor 112.

Figure 1C:
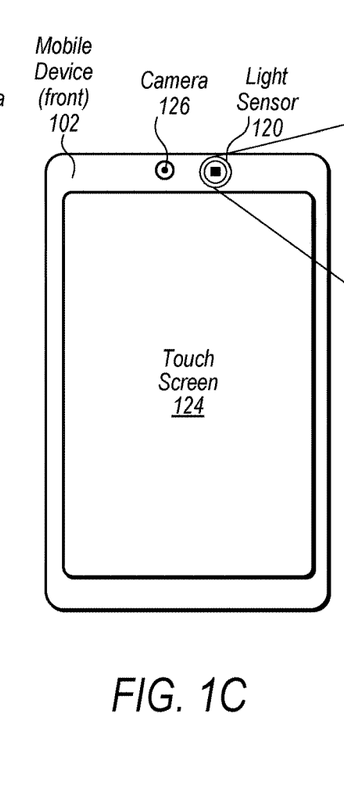
Figure 1D:
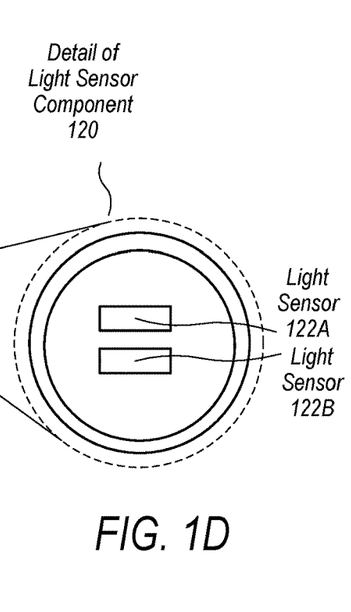

FIG. 1C illustrates Mobile Device 102 (front) with a Touch Screen 124, Camera 126 and Light Sensor 120. FIG. 1D illustrates Detail of the Light Sensor Component 120 having Light Sensors 122A and 122B. The light sensors may be photodiodes or the like, in a non-limiting example. In some embodiments, the Light Sensors 122A/B may be illuminance sensors.

Figure 2B:
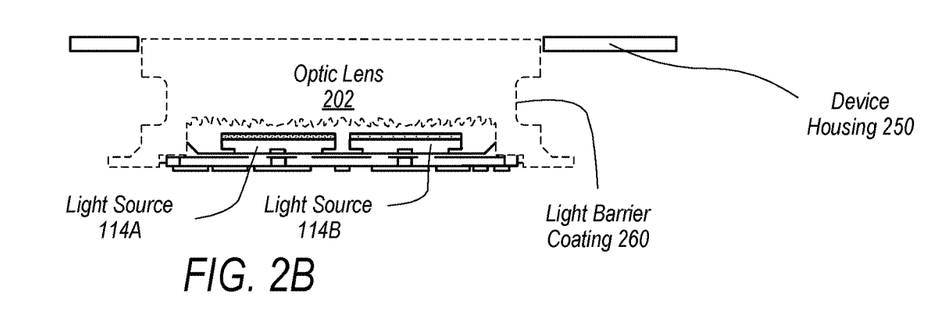
Figure 2C:
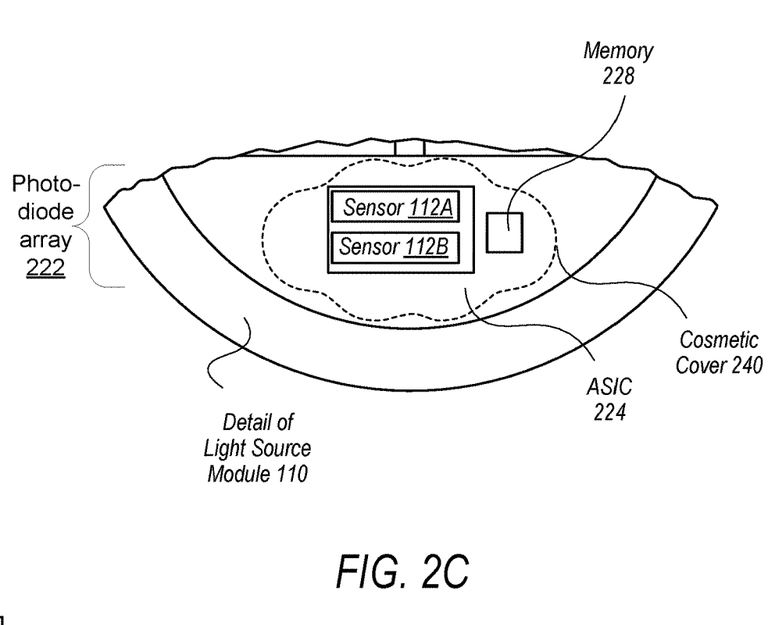

FIGS. 2A-2C illustrate embodiments of a light source module 110 with integrated ambient light sensing capability via a shared aperture, in accordance with some embodiments. FIG. 2A illustrates Light Source Module 110 with Sensors 112A/B (illuminance sensors or other, etc.), Light Sources 114A/B, Optic Lens 202, and Connectors 204 A/B. In embodiments, Connectors 204 A/B may provide access to the Sensors 112A/B and or Light Sources 11A/B to control the one or more light emitter components and/or provide connections to transmit the measurement signal(s) from the one or more light sensor components 112A/B (e.g., to the device 102). In the illustrated embodiment, the dashed, curved lines indicate one or more features of a Fresnel lens.

FIG. 2B illustrates a side view of the Light Source Module 110 having Light Sources 114A/B, Optic Lens 202 (e.g., a Fresnel lens or otherwise), housing 250 and Light Barrier 260 (e.g., a coating, opaque sheet, or otherwise).

FIG. 2B illustrates the optics lens 202 may fill the aperture 116 area. In particular the dotted curved lines in FIG. 2A and the rough edge illustrated below the number 202 in FIG. 2B illustrate that the optic lens may be a Fresnel lens or some other type of lens made of plastic, glass or other suitable optics. Optic lens 202 may be modified to be particularly-suited to the light source module 110. For example, it is contemplated that various portions of a Fresnel-type portion of the Optic Lens 202 may be particularly configured to concentrate light passing through the Optic Lens 202. For example, the Fresnel lens may be configured to concentrate light passing into the light source module onto the sensor(s) 112A/B. Other portions of the optic lens 202 may be configured to project light generated by the light sources 114A/b.

FIG. 2C illustrates that Light Source Module 110 may include an array of Sensors 112A/B. In embodiments, the Light Source Module 110 may include any number of Sensors 112 (e.g., one sensor for each of several ranges of wavelengths of light, or otherwise). FIG. 2C illustrates that Light Source Module 110 may include Memory 228, for storing calibration parameters or program instructions, in various embodiments. In some embodiments, to determine the measurement of illuminance that serves as the basis for performing the one or more operations of the mobile computing device, the mobile computing device is configured to reference one or more calibration parameters (e.g., calibration parameters stored in Memory 228 or stored in device memory) based on the signal from a corresponding one of the light sensing components. FIG. 2C illustrates that Light Source Module 110 may have a Cosmetic Cover 240 for filtering light traveling to the Sensors 112A/b, for example. The Cosmetic Cover 240 may be placed directly on the ASIC, in embodiments. The Cosmetic Cover 240 may be arranged so as to not interfere with light passing through the optics to the sensors 112A/B, in embodiments.

FIG. 3 illustrates a combined schematic/block diagram of portions of a light source module with integrated ambient light sensing capability via a shared aperture, in the context of a mobile device. In the illustrated embodiment, Light Source Module 110 (sometimes referred to as a camera strobe) includes LED light sources 114A/B that produce light that passes out through aperture 116 in housing 250 and Illuminance Sensor 112 that receives light received through aperture 116.

Also illustrated is Camera Module 302 (e.g., including a camera sensor for receiving light through a different Aperture 316) and for controlling LED light sources 114A/B to emit light that reflects off surfaces and returns to a sensor of the Camera Module 302 and that may receive a signal from Illuminance Sensor 112. Camera Module 302 is illustrated with a Data/Communication link with Application Processor 304 that itself has a Data/Communication link with Illuminance Sensor 112, in embodiments. Application Processor 304 and/or Camera Module 302 may receive a signal indictive of illuminance from the Illuminance Sensor via the Data/Communication link, in embodiments. Power Management Unit 306 is illustrated as providing power/current to various of the illustrated components.

Light illuminance information may be provided to the application processor 304 as an analog signal or via a serial connection with the help of an internal analog-to-digital converter 307. The application processor 304 can then use the information to control the camera module 304 and/or a display (e.g., 124) of the mobile device to make adjustments to the camera or display settings, in embodiments.

FIG. 3 illustrates Proximity Sensor 104 that emits and receives light (e.g., a light detection and ranging (LiDAR) component or the like). Some LiDAR systems have a single aperture to emit light and measure the reflection of the emitted light. This is distinctly different from a Light Source Module that includes illuminance sensors at least because in the case of the Light Source Module, the light received by the illuminance sensor does not include reflected light from the emitted light of the Light Source Module, in embodiments.

In some embodiments, various components may be protected from interference between the light producing components of the device 102 (e.g., a proximity sensor or the like) by Light Barrier coatings 260, opaque sheeting or the like. In some embodiment, the device may be configured to turn the light producing feature off when the signal from the light sensing component is being read by the device, or may ignore the signal, relying on an earlier, known good value for illuminance, instead.

Illuminance sensor 112 may sense light in a different spectrum from that sensed by a camera sensor (an image sensor), in embodiments. Illuminance sensor 112 may sense light in a different spectrum from that sensed by a proximity sensor (e.g., LiDAR or similar), in embodiments.

Figure 4:
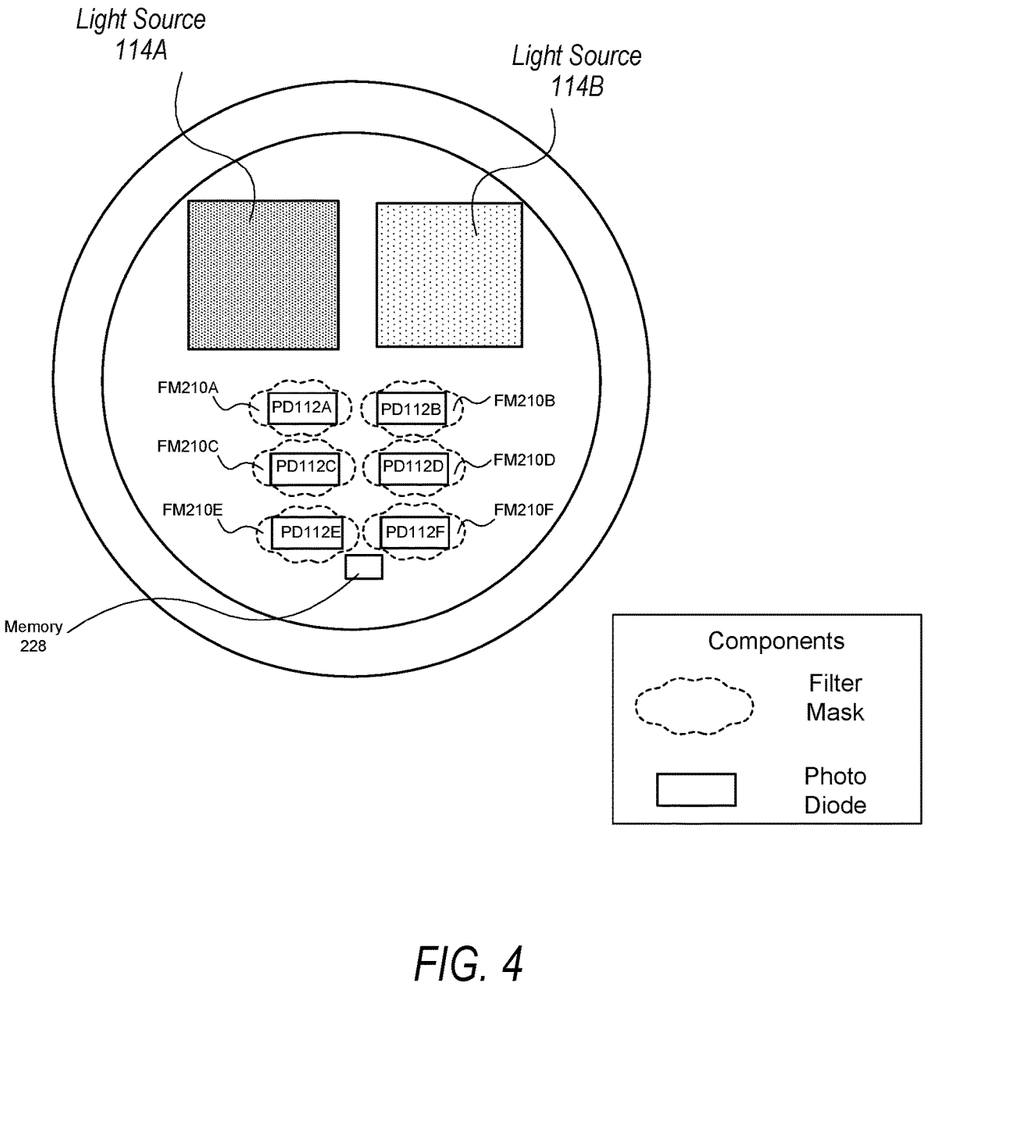
FIG. 4 illustrates a light source module with integrated ambient light sensing capability via a shared aperture, in accordance with some embodiments.

FIG. 4 illustrates a light source module with integrated ambient light sensing capability via a shared aperture, in accordance with some embodiments. In the illustrated embodiment, Light Source Module 110 includes Light Sources 114A/B (although embodiments with fewer or more light sources are contemplated, without limitation) and an array of light sensing Photo Diodes 112A-F with corresponding Filter Masks 210A-F and memory 228.

In some embodiments, each of the photodiodes may be particularly suited to sensing a different particular wavelength range (e.g., illuminance in a range of a portion of the visible light spectrum, the infrared light spectrum or the ultraviolet light spectrum, etc.). In embodiments, the corresponding filter masks act as bandpass filters, each particularly-tailored to filter the light for the particular range of the respective sensor. In some embodiments, the Light Source Module may arrange more than one photodiode underneath a single filter mask. The filter masks may selectively transmit light (e.g., selectively transmit infrared light or ultraviolet light) to the one or more light sensing components.

In some embodiments, the Light Source Module 110 includes a first visible light-measuring photodiode element PD112A that produces a signal indicating the measurement of the received illuminance, and a corresponding first bandpass filter FM210A to prevent wavelengths other than those of a visible light wavelength range to pass from the aperture to the first photodiode element. The Light Source Module 110 may also include a second infrared-measuring photodiode element PD112B that produces a signal that indicates an amount of infrared (IR) light received by the second photodiode PD112B, and a corresponding second bandpass filter FM210B to prevent wavelengths other than those of an infrared light wavelength range to pass from the aperture to the second photodiode element. A controller (e.g., 304) may determine, based at least in part on the measurement of received illuminance, and the amount of infrared light, a ratio of IR light to visible light, and perform, based at least in part on the ratio, the one or more operations of the mobile computing device, in embodiments.

In some embodiments, a Light Source Module may include multiple light sensors in the light source module where each sensor is calibrated/configured for a different frequency range of light.

Figure 5:
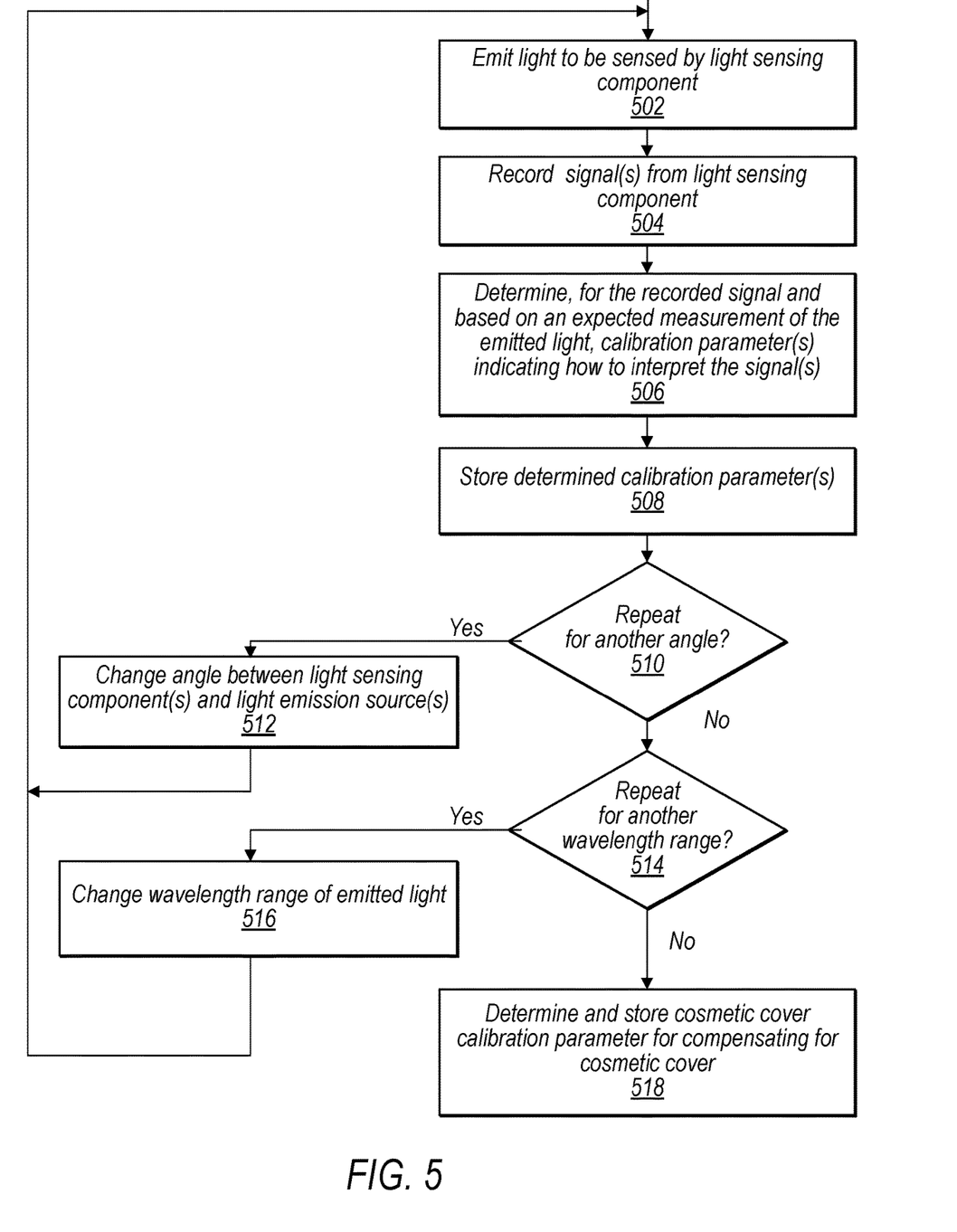
FIG. 5 illustrate a flow diagram of a calibration process for a light source module with integrated ambient light sensing capability, in accordance some embodiments.

FIG. 5 illustrates a flow diagram of a calibration process for a light source module with integrated ambient light sensing capability, in accordance some embodiments. The calibration process may be performed for the light source module prior to installation into a device (e.g., prior to installation into a camera, smartphone, or other portable device, etc.) or after installation, in embodiments. The calibration may be performed for a light source module with one or more light sensors components (e.g., for one or more diodes or the like, particularly tailored for respective ranges of wavelengths of light). It is contemplated that the calibration process may repeatedly be performed for each of a plurality of diodes, one by one (in a series of calibrations), or may be performed all at once for all of the one or more light sensors at once (e.g., in parallel during a single same light exposure).

In some embodiments, calibration may be performed to compensate for the effect of a cosmetic cover on the light received by the sensor. For example, in some embodiments, an external or outside cover or shell of a device 102 may include to a cover over the aperture, (e.g., to make the area around the aperture smooth and/or to color-match the rest of the outside shell, etc.). The cover may affect the light received by the sensor. A calibration process such as the one illustrated in FIG. 5 may compensate for the influence of the cosmetic cover on the illuminance measured by the sensor 112.

Light to be sensed by the one or more light sensing components is emitted (block 502). For example, one or more light sources may be triggered in a controlled environment to produce a known amount of illuminance on the sensor. For example, light of a particular wavelength range and/or causing a particular illuminance on the sensor may be emitted. A signal from the light sensing component(s) is recorded (block 504). For the recorded signal, a determination, based on an expected measurement of the emitted light, of a calibration parameter indicating how to interpret the signal is made (block 506). In some embodiments, calibration equipment external to the light source module may record the signal and make the determination, but it is also contemplated that the light sensing components may be equipped with hardware to support the receipt and/or determination. In some embodiments where the light sensing component is located in a device during calibration, the device may include functionality for receiving the signal(s) and determining the parameter(s). At block 508, the determined calibration parameter(s) are stored (e.g., stored to memory that is part of the light sensing component, or stored to memory of a device in which the light sensing component is installed).

At block 510, a determination is made whether to repeat steps 502-508 for another angle. For example, some sensors produce different signals based on an angle of the light hitting the sensor. The process of steps 502-508 may be repeated (block 510 yes) for a different angle, or the process may continue (block 510, no). At block 514, a determination of whether to repeat the process 502-510 for another wavelength may be made. If so, (block 514, yes) a light wavelength controller may change the wavelength range of the emitted light (block 516) and steps 502-510/512/524 repeated. The process may be repeated over various different ranges or wavelengths of light, for example, producing numerous calibration parameters, in some embodiments. If not (block 514, no) the system may end the process by determining and storing a cosmetic cover calibration parameter for compensating for a cosmetic cover over the aperture, either in memory on the light source module 110 or in memory of the device 102 for example. For example, logic in a calibration unit located on or off the light source module (e.g., on calibration equipment or part of the device 102) may determine, based on the expected response of the sensor to the emitted light, a cosmetic cover calibration parameter the compensate for changes to the emitted light due to passing through a cosmetic cover.

Figure 6:
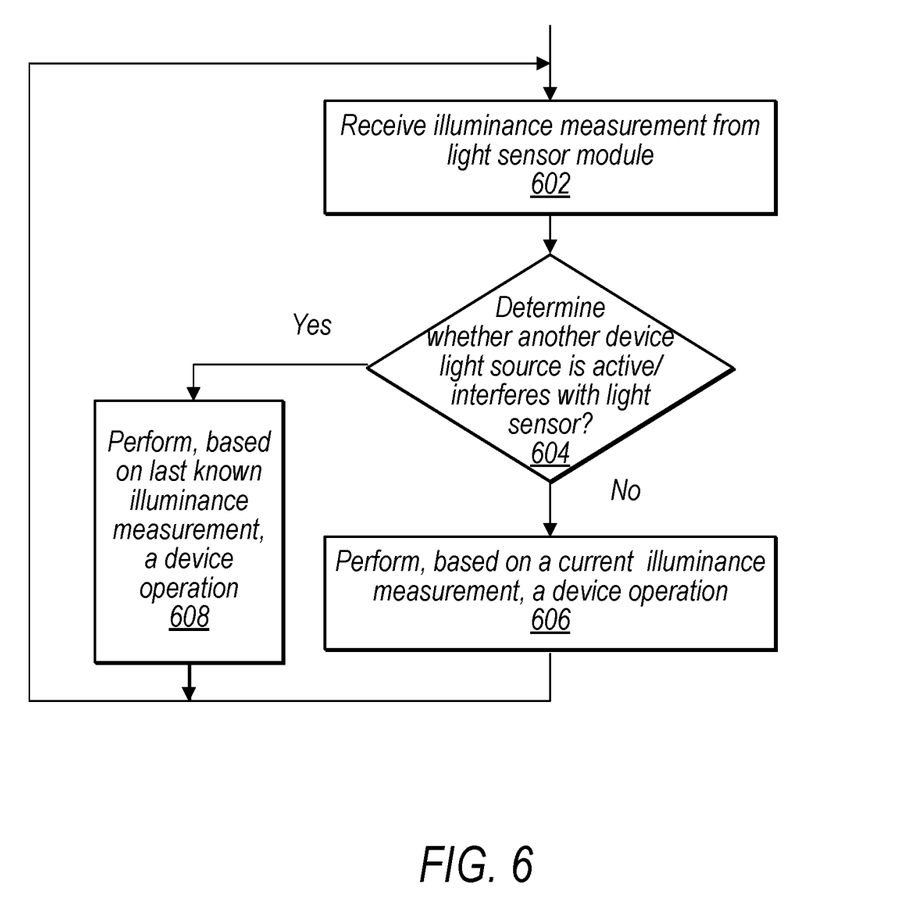
FIG. 6 illustrates a flow diagram of operation of a device that includes a light source module with integrated ambient light sensing capability, in accordance with some embodiments.

FIG. 6 illustrates a flow diagram of operation of a device that includes a light source module with integrated ambient light sensing capability, in accordance with some embodiments. The illustrated embodiment, and similar alternative embodiments, may be performed by device 102, in embodiments. For example, device 102 in FIGS. 1, 7 and 8 may include program instructions 822 in accordance with logic to carry out the functionality illustrated in FIG. 6.

At block 602, a measurement of illuminance is received, from an illuminance sensor 112 of light source module 110 of Mobile Device 102 in FIG. 1A in a non-limiting example. At block 604, a determination is made whether another device light source is active or if another device light source interferes with the illuminance sensor. In some embodiments, the device may make the determination based on a quality of a signal from the sensor, or based on known activity of a light source. In some embodiments, a controller (e.g., Application Processor 304) may determine, based upon a quality of a signal indicating the measurement of illuminance or based upon coordination with other light-emitting components of the mobile computing device, whether to use a current illuminance measurement, or a last-known illuminance measurement as the basis for controlling the one or more operations of the mobile computing device. If it is determined another device light source is active or if another device light source interferes with the illuminance sensor (block 604, yes) the device may perform, based on a last known-good illuminance measurement, a device (or camera) operation (block 608), such as but not limited to controlling a display brightness or an autofocus feature of a camera. If it is determined that another device light source is not active or that another device light source is not interfering with the illuminance sensor (block 604, no) the device may perform, based on a current illuminance measurement, a device (or camera) operation (block 606), such as but not limited to controlling a display brightness or an autofocus feature of a camera.

In some embodiments, the device may determine, based at least in part on the illuminance measurement, a type of light source associated with the illuminance. The device may control one or more camera-based or mobile computing device-based operations based at least in part on the determined type of light source.

In some embodiments, the one or more camera-based or mobile computing device-based operations may include, but are not limited to, an auto exposure operation for the camera component of the mobile computing device, or a display brightness adjustment operation for the display component of the mobile computing device.

Figure 7:
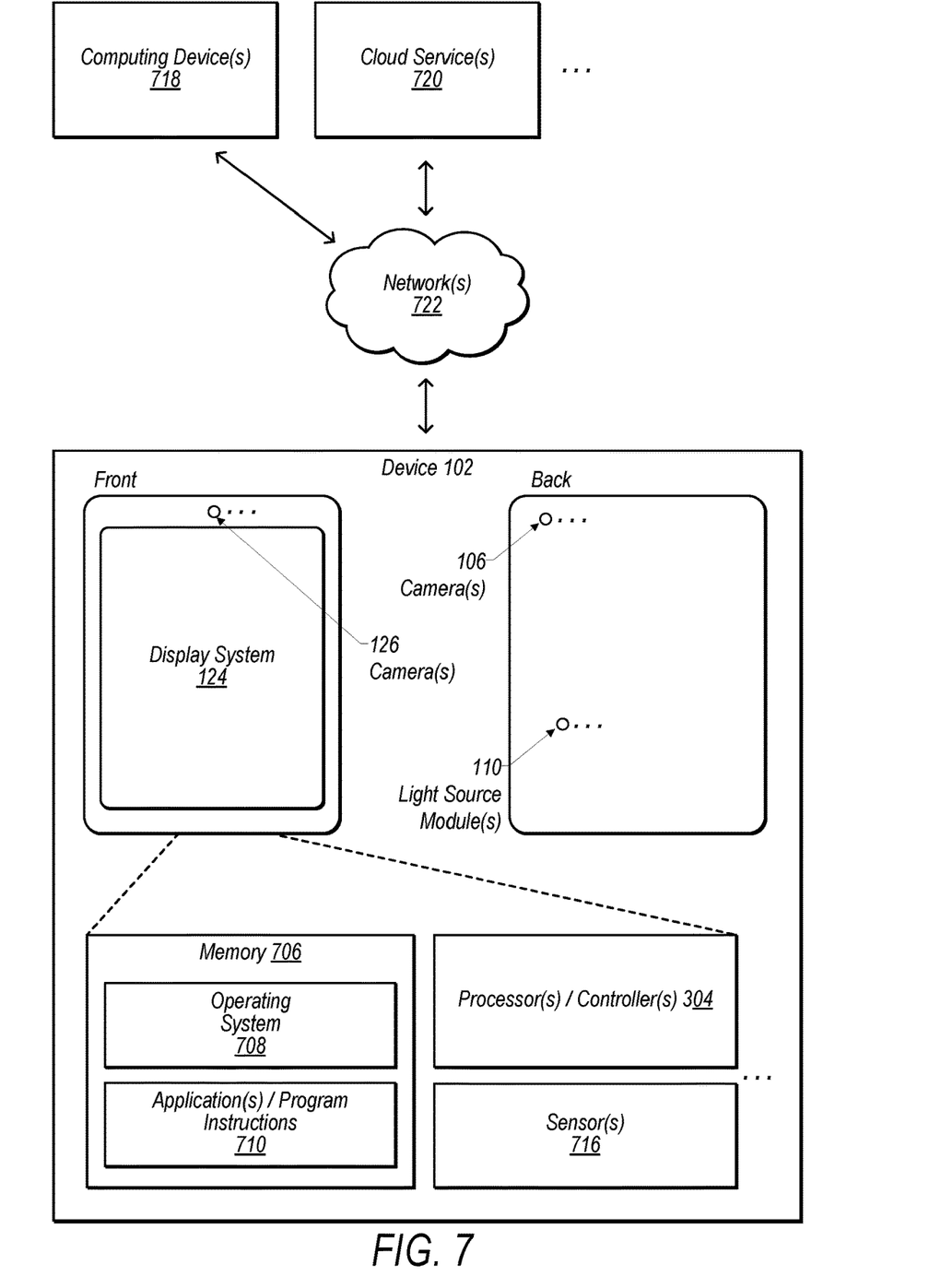
FIG. 7 illustrates a block diagram of an example device that may include a light source module with integrated ambient light sensing capability via a shared aperture, in accordance with some embodiments.

FIG. 7 illustrates a schematic representation of an example device 102 that may include one or more cameras 106 and one or more light source module(s) 110. For example, the device 102 may include one or more light source module(s) 110 with integrated ambient light sensing capability via a shared aperture, such as the light source module arrangement described herein with reference to FIGS. 1-6. In some embodiments, the device 102 may be a mobile device and/or a multifunction device. In various embodiments, the device 102 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 102 may include a display system 124 (e.g., comprising a display and/or a touch-sensitive surface) and/or one or more cameras 106. In some non-limiting embodiments, the display system 124 and/or one or more front-facing cameras 126 may be provided at a front side of the device 800, e.g., as indicated in FIG. 7. Additionally, or alternatively, one or more rear-facing cameras 106 may be provided at a rear side of the device 800. In some embodiments comprising multiple cameras 106, some or all of the cameras 106 may be the same as, or similar to, each other. Additionally, or alternatively, some or all of the cameras 106 may be different from each other. In various embodiments, the location(s) and/or arrangement(s) of the camera(s) 106 may be different than those indicated in FIG. 7.

Among other things, the device 102 may include memory 706 (e.g., comprising an operating system 708 and/or application(s)/program instructions 710 (such as instructions for performing camera and/or device functions based at least in part on signals from one or more sensors of the light source module 110)), one or more processors and/or controllers 704 (e.g., comprising CPU(s), memory controller(s), display controller(s), and/or camera controller(s), etc.), and/or one or more sensors 714 (e.g., orientation sensor(s), proximity sensor(s) 104, and/or position sensor(s), etc.). In some embodiments, the device 102 may communicate with one or more other devices and/or services, such as computing device(s) 718, cloud service(s) 720, etc., via one or more networks 722. For example, the device 102 may include a network interface (e.g., network interface 840 in FIG. 8) that enables the device 102 to transmit data to, and receive data from, the network(s) 722. Additionally, or alternatively, the device 102 may be capable of communicating with other devices via wireless communication using any of a variety of communications standards, protocols, and/or technologies.

Figure 8:
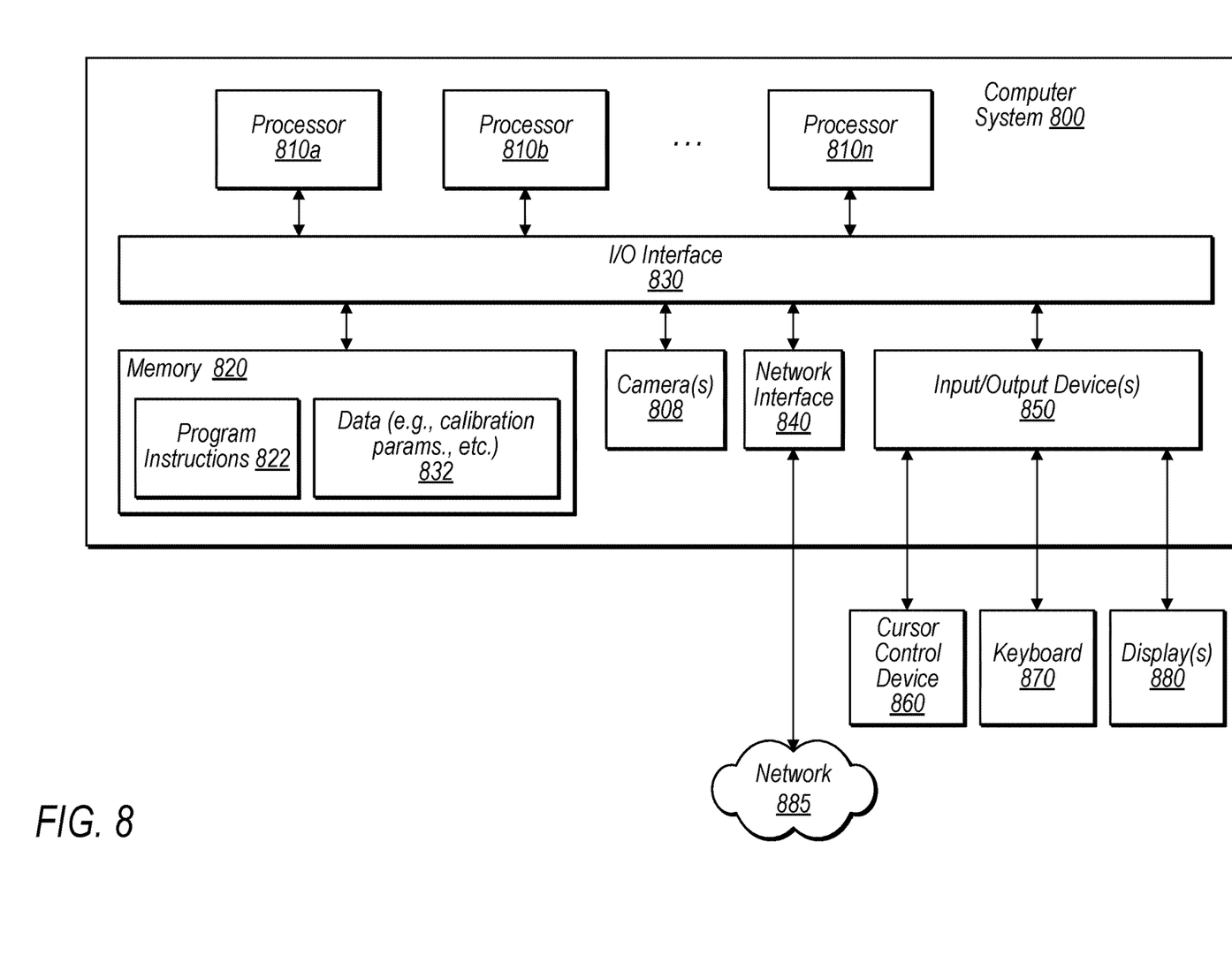
FIG. 8 illustrates a schematic block diagram of an example computer system that may include may include a light source module with integrated ambient light sensing capability via a shared aperture, in accordance with some embodiments.

FIG. 8 illustrates a schematic block diagram of an example computer system 800 that may include a light source module with integrated ambient light sensing capability via a shared aperture, e.g., as described herein with reference to FIGS. 1-7. In addition, computer system 800 may implement methods for controlling operations of the device and/or camera and/or for performing image processing on images captured with the camera. In some embodiments, the device 102 (described herein with reference to FIGS. 1, 3 and 7) may additionally, or alternatively, include some or all of the functional components of the described herein.

The computer system 800 may be configured to execute any or all of the embodiments described above. In different embodiments, computer system 800 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 800 includes one or more processors 810*a-n* coupled to a system memory 820 via an input/output (I/O) interface 830. Computer system 800 further includes one or more cameras 808 coupled to the I/O interface 830. Computer system 800 further includes a network interface 840 coupled to I/O interface 830, and one or more input/output devices 850, such as cursor control device 860, keyboard 870, and display(s) 880. In some cases, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements.

In various embodiments, computer system 800 may be a uniprocessor system including one processor 810*a*, or a multiprocessor system including several processors 810*a-n* (e.g., two, four, eight, or another suitable number). Processors 810*a-n* may be any suitable processor capable of executing instructions. For example, in various embodiments processors 810*a-m* may be general-purpose or embedded processors implementing any of a variety of instruction set architectures (ISAs), such as the x86, PowerPC, SPARC, or MIPS ISAs, or any other suitable ISA. In multiprocessor systems, each of processors 810*a-n* may commonly, but not necessarily, implement the same ISA.

System memory 820 may be configured to store program instructions 822 accessible by processor 810*a*. In various embodiments, system memory 820 may be implemented using any suitable memory technology, such as static random-access memory (SRAM), synchronous dynamic RAM (SDRAM), nonvolatile/Flash-type memory, or any other type of memory. Additionally, existing camera control data 832 of memory 820 may include any of the information or data structures described above. In some embodiments, program instructions 822 and/or data 832 may be received, sent or stored upon different types of computer-accessible media or on similar media separate from system memory 820 or computer system 800. In various embodiments, some or all of the functionality described herein may be implemented via such a computer system 900.

In one embodiment, I/O interface 830 may be configured to coordinate I/O traffic between processor 810*a*, system memory 820 and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820 into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processors 810*a*.

Network interface 840 may be configured to allow data to be exchanged between computer system 800 and other devices attached to a network 885 (e.g., carrier or agent devices) or between nodes of computer system 800. Network 885 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output device(s) 820 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 900. In some embodiments, similar input/output devices may be separate from computer system 800 and may interact with one or more nodes of computer system 800 through a wired or wireless connection, such as over network interface 840.

Those skilled in the art will appreciate that computer system 800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
   a light source module, comprising:
      an aperture defining an area in a plane of the aperture, and configured to emit and receive light;
      one or more light emitting components located behind the aperture within an area aligned with the area defined by the aperture in a direction orthogonal to the plane, and configured to emit light through the aperture;
      one or more light sensor components located behind the aperture within the area aligned with the area defined by the aperture, and configured to measure illuminance received through the aperture and emit a signal indicating a measurement of the received illuminance; and
      one or more connections configured to control the one or more light emitting components and one or more connections to transmit the measurement signal from the one or more light sensor components.

2. The device of claim 1, wherein:
   a first one of the light sensing components is configured to measure a first illuminance over a first wavelength range of light; and
   the light source module further comprises a second one of the light sensing components configured to:
      measure, over a second wavelength range of light distinct from the first wavelength range of light, a second illuminance received through the aperture, and
      emit a signal indicating a measure of the second illuminance for the second wavelength range.

3. The device of claim 2, wherein:
   the first wavelength range over which the first light sensing component is configured to measure illuminance includes a visible light spectrum, an infrared light spectrum or an ultraviolet light spectrum; and
   the second wavelength range over which the second light sensing component is configured to measure illuminance includes one of the visible light spectrum, an infrared light spectrum or an ultraviolet light spectrum;
   wherein the first wavelength range is different from the second wavelength range.

4. The device of claim 2, wherein:
   the first wavelength range over which the first light sensing component is configured to measure illuminance includes a first portion of visible light spectrum; and
   the second wavelength range over which the second light sensing component is configured to measure illuminance includes a second portion of the visible light spectrum.

5. The device of claim 1, wherein:
   the light source module further comprises one or more filter masks configured to selectively transmit infrared light or ultraviolet light to the one or more light sensing components; and
   at least one of the light sensing components is configured to sense illuminance of infrared or ultraviolet light.

6. The device of claim 1, wherein the light source module further comprises:
   memory configured to store calibration parameters, the calibration parameters determined via a calibration process that calibrates the measurement signal with respect to the received illuminance.

7. The device of claim 1, wherein the light source module further comprises:
   one or more light blocking features configured to prevent non-ambient light from interfering with the one or more light sensing components reception of ambient light via the aperture.

8. A mobile computing device, comprising:
   a display component;
   a camera component;
   a light source module, comprising:
      an aperture defining an area in a plane of the aperture;
      one or more light emitting components located behind the aperture within an area aligned with the area defined by the aperture in a direction orthogonal to the plane, and configured to emit light through the aperture;
      one or more light sensing components located behind the aperture within the area aligned with the area defined by the aperture, and configured to measure illuminance received through the aperture and emit a signal indicating a measurement of the received illuminance; and
   a controller configured to perform, based at least in part on the measurement of illuminance, one or more operations of the mobile computing device.

9. The mobile computing device of claim 8, wherein:
   a first one of the light sensing components is configured to measure, over a first wavelength range of light, a first illuminance; and
   a second one of the light sensing components is configured to:
      measure, over a second wavelength range of light distinct from the first wavelength range of light, a second illuminance and emit a signal indicating a measurement of the second illuminance for the second wavelength range.

10. The mobile computing device of claim 8, wherein the one or more light sensing components comprise:
   a first visible light-measuring photodiode element configured to produce the signal indicating the measurement of the received illuminance, and a corresponding first bandpass filter configured to prevent wavelengths other than those of a visible light wavelength range to pass from the aperture to the first photodiode element; and
   a second infrared-measuring photodiode element configured to produce a signal that indicates an amount of infrared (IR) light received by the second photodiode, and a corresponding second bandpass filter to prevent wavelengths other than those of an infrared light wavelength range to pass from the aperture to the second photodiode element; and
   wherein the controller is further configured to:
      determine, based at least in part on the measurement of received illuminance, and the amount of infrared light, a ratio of IR light to visible light; and
      perform, based at least in part on the ratio, the one or more operations of the mobile computing device.

11. The mobile computing device of claim 8, wherein:
   the light source module further comprises one or more filter masks configured to selectively transmit infrared light or ultraviolet light to one or more of the one or more light sensing components; and
   at least one of the light sensing components is configured to sense illuminance of infrared or ultraviolet light.

12. The mobile computing device of claim 8, wherein the controller is further configured to:
   determine, based at least in part on the illuminance measurement, a type of light source associated with the illuminance; and
   control one or more camera-based or mobile computing device-based operations based at least in part on the determined type of light source.

13. The mobile computing device of claim 12, wherein to perform the one or more camera-based or mobile computing device-based operations based at least in part on the determined type of light source, the controller is further configured to perform an auto exposure operation for the camera component of the mobile computing device, or a display brightness adjustment operation for the display component of the mobile computing device.

14. The mobile computing device of claim 8, wherein to determine the measurement of illuminance that serves as the basis for performing the one or more operations of the mobile computing device, the mobile computing device is configured to reference one or more calibration parameters, based on the signal from a corresponding one of the light sensing components.

15. The mobile computing device of claim 8, wherein the mobile computing device comprises memory configured to store calibration parameters, the calibration parameters determined via a calibration process that calibrates the measurement signal with respect to the received illuminance.

16. A method, comprising:
   obtaining, by a controller of a mobile computing device, a measurement of illuminance received by a light sensing component, behind a shared aperture defining an area in a plane of the shared aperture, of the mobile computing device, the illuminance received via the shared aperture, wherein the light sensing component is located within an area aligned with the area defined by the aperture in a direction orthogonal to the plane, and wherein one or more light emitting components are located behind the shared aperture within the area aligned with the area defined by the aperture and emit light through the shared aperture; and
   controlling, by the controller based at least in part on the illuminance measurement, one or more operations of the mobile computing device.

17. The method of claim 16, wherein said controlling one or more operations of the mobile computing device comprises controlling, based at least in part on the illuminance measurement, a display-based operation, or a camera-based operation.

18. The method of claim 16, wherein said controlling one or more operations of the mobile computing device comprises controlling, based at least in part on the illuminance measurement, a display brightness adjustment function for a display of the mobile computing device.

19. The method of claim 16, wherein said controlling one or more operations of the mobile computing device comprises controlling, based at least in part on the illuminance measurement, an auto exposure function for a camera component of the mobile computing device.

20. The method of claim 16, further comprising:
   determining, by the controller based upon a quality of a signal indicating the measurement of illuminance or based upon coordination with other light-emitting components of the mobile computing device, whether to use a current illuminance measurement, or a last-known illuminance measurement as the basis for controlling the one or more operations of the mobile computing device.

* * * * *